(12) United States Patent
Adler

(10) Patent No.: US 12,222,741 B2
(45) Date of Patent: Feb. 11, 2025

(54) EXTENDER AND STABILIZER FOR SOLAR STRING POWER GENERATION SYSTEMS AND A METHOD THEREOF

(71) Applicant: SOLAD-SOLAR ELECTRONICS LTD., Jerusalem (IL)

(72) Inventor: Shlomo Haim Adler, Jerusalem (IL)

(73) Assignee: SOLAD—SOLAR ELECTRONICS LTD., Jerusalem (IL)

( * ) Notice: Subject to any disclaimer, the term of this patent is extended or adjusted under 35 U.S.C. 154(b) by 0 days.

(21) Appl. No.: 18/038,572

(22) PCT Filed: Nov. 25, 2021

(86) PCT No.: PCT/IL2021/051402
§ 371 (c)(1),
(2) Date: May 24, 2023

(87) PCT Pub. No.: WO2022/113074
PCT Pub. Date: Jun. 2, 2022

(65) Prior Publication Data
US 2024/0004413 A1  Jan. 4, 2024

Related U.S. Application Data

(60) Provisional application No. 63/118,941, filed on Nov. 29, 2020.

(51) Int. Cl.
*G05F 1/67* (2006.01)
*H02J 7/35* (2006.01)

(52) U.S. Cl.
CPC .................. *G05F 1/67* (2013.01); *H02J 7/35* (2013.01); *H02J 2300/26* (2020.01)

(58) Field of Classification Search
CPC ............ G05F 1/67; H02J 7/35; H02J 2300/26
See application file for complete search history.

(56) References Cited

U.S. PATENT DOCUMENTS

| 7,605,498 B2 | 10/2009 | Ledenev et al. |
| 8,465,861 B2 | 6/2013 | Yamamoto et al. |

(Continued)

FOREIGN PATENT DOCUMENTS

| CN | 105827180 A | 8/2016 |
| EP | 3726688 A | 10/2020 |
| WO | 2020105030 A1 | 5/2020 |

OTHER PUBLICATIONS

International Search report PCT/IL2021/051402 dated Feb. 21, 2022 (pp. 1-8) and written opinion thereof (pp. 1-5).

*Primary Examiner* — Carlos Amaya
(74) *Attorney, Agent, or Firm* — Millen White Zelano & Branigan; Csaba Henter

(57) ABSTRACT

The present invention relates to an apparatus and method for extending solar photovoltaic system's strings size and stabilizing their DC-Bus voltage at any desired constant level up to the maximum level permitted by the local electric code (LEC), This will maximize the energy production of a multi module solar string power generation system, comprising; an Injection Circuit (IC), connected to a DC-Bus and to a primary substring of solar panels, wherein the IC is also connected to an extension substring with at least one solar panel. The IC lifts up and regulates the voltage of the connected primary substring and the extension substring to a desired stabilized constant level at the input of the solar inverter. The IC comprises: (i) a first MPPT mechanism, for finding the MPP of the primary substring; (ii) a second MPPT mechanism, for finding the MPP of the extension substring; (iii) a first DC/DC converter for converting some of the power from the extension substring, for lifting up and regulating the voltage level of the primary substring; and (iv) a second DC/DC converter, for lifting up and regulating the voltage level of the extension substring and for conduct- (Continued)

ing the excess power from the extension substring to the solar inverter via the DC-Bus.

10 Claims, 10 Drawing Sheets

(56) References Cited

U.S. PATENT DOCUMENTS

| | | |
|---|---|---|
| 2010/0126550 A1 | 5/2010 | Foss |
| 2012/0081934 A1 | 4/2012 | Garrity et al. |
| 2016/0268809 A1 | 9/2016 | Ledenev et al. |
| 2022/0011802 A1* | 1/2022 | Nemenman ............. H02J 3/381 |

* cited by examiner

EXTENDER AND STABILIZER FOR SOLAR STRING POWER GENERATION SYSTEMS AND A METHOD THEREOF

TECHNICAL FIELD

The present invention relates to Photovoltaic solar power generation systems. More particularly, the present invention relates to a method and apparatus for maximizing the power produced from multi module solar string power generation systems.

BACKGROUND

As of today, Photovoltaic solar power generation systems are typically made up of solar panels comprising photovoltaic "cells". Photovoltaic cells are semiconductor devices that convert light into energy. When light shines on a panel, a voltage develops across the panel, and when connected to a load, current flows. FIG. 1 exhibits the electrical power production performances of a cell of solar panels, based on their voltage and current characteristics (I-V curve). The voltage and current vary with several factors including the physical size of the panel, the panel efficiency, the amount of light shining on the panel, the temperature of the panel and other factors.

Typically, a number of solar panels are connected in series, referred to as a "string", to create an increased output voltage. As a general rule, the higher the voltage—the less the energy loss, hence the higher the efficiency of the system. In addition, a large panel strings with more panels requires less solar cables, less combiner boxes, less junction boxes, less excavation works and less installation time. This is especially significant in large scale systems which typically have high current densities and longer cables for carrying the produced power. Thus, it is desirable to connect as much panels in series as possible in a string in order to increase the voltage at the expense of the current.

However, the permitted maximum output voltage of a single string is typically limited by Local Electrical Codes (LEC) and standards due to the hazardous nature of high voltage. Thus, to generate substantial power at a minimum loss while complying with the regulations, photovoltaic power generation systems are typically comprised of many strings, each comprising as many panels serially connected as permitted, where the strings are connected in parallel. These parallel-connected strings are referred to as "arrays". Since the strings are connected in parallel, the number of solar panels in each string comprising the array should be exactly the same.

When solar panels are not connected to a load, the voltage developed across their terminals is defined as their open circuit voltage (Voc) as shown in FIG. 1. As known in the art, the maximum number of solar panels connected serially in a string is calculated by dividing the maximum DC-Bus voltage level allowed by the LEC or the inverter input voltage limit, by the Voc value of the panels at their lowest seasonal temperature at a particular site where they are installed. However, the Voc of a string is typically 24% higher than the maximum power point voltage (Vmpp as shown in FIG. 1), which is what the string typically produces under optimal operating conditions. This means that there is a considerable wasted working voltage range that could have significantly improve system's efficiency to the extent that it could be used.

Since the Solar cells generate DC power, while the electricity grid is typically AC power, an "inverter" has to be connected. An inverter may be connected to an array of many parallel-connected strings, for converting their DC power to AC power, for feeding the electricity grid or local consumers.

Most solar inverters contain Maximum Power Point Tracking (MPPT) circuitry for maximizing the power from the strings. These known-in-the-art MPPT circuits adjust the voltage and the current at which the arrays operate, measure their output power, and seek those voltage and current values at which power output is maximized. Therefore, the MPPT of the array is typically done by the inverter.

However, a maximum power point varies continually on a momentary basis due to changes of solar irradiation, ambient temperature, clouds, shading, sun light angle, weather conditions changes and other factors. The purpose of a MPPT mechanism is to track these changes continuously and repetitively tunes its working point to the array maximum power point voltage for gaining maximum power. Yet, the variance in the MPP level, which may total to hundreds of Volts, have a negative effect on the efficiency of the inverter, since the most efficient voltage entrance variance, for a typical inverter, is relatively narrow. In addition, when the voltage of the array drops—the total efficiency of the system drops as well as described above.

Arrays generate their maximum power when all the cells, panels and strings, comprising the array, operate at their maximum power point. Yet, diverse conditions such as manufacturing tolerance mismatch, cells' aging, shading, clouds, dust, dirt, azimuth and tilt, as well as various deficiencies may cause some of the panels in the strings to produce less energy. A weak string, since it is parallel-connected to the other strings in the array, may have an austere impact on the efficiency of the whole array and the efficiency of the entire inverter. Since the voltage of the array drops the MPPT is changed and therefore, the total efficiency of the system drops as well and it may disturb the balance of the array. It is of great significant especially in large scale inverters which have large arrays connected through long electrical cables.

It is therefore desired to introduce cost-effective means to enable solar systems to utilize the full power production as possible by ensuring that each individual string in the array operates at its Maximum Power Point, that there is no mutual interference between strings and that the loss of energy conduction is minimal which means that the array is perfectly balanced.

One approach to solve these problems is to equip each panel in a string with an optimizer that regulates the panel voltage as needed. This approach is expensive as an optimizer is needed for each panel in the array and since it is based on full energy conversion using DC/DC technology, it implies relatively high conversion losses.

Other solution is based on an optimizer that includes a MPPT circuit for each string, known as "String Optimizer". Yet, this architecture is based on full energy conversion using DC/DC technology which resulting in a relative expensive hardware, implies high conversion losses and its string size is still limited by the Voc maximum level constrain.

Other solutions have an inverter that includes a separate MPPT circuit for each string or small number of strings connected to the inverter, known as "String Inverters". However, this architecture is expensive and not efficient in high scale installations with several hundred or even thousands of strings in a large area since it requires much more DC cables which resulting in significant recurring conduction losses. Also it undergoes energy losses due to high variance in MPPT levels and its string size is limited by the Voc maximum level constrains.

U.S. Pat. No. 7,605,498 discloses a high efficiency photovoltaic DC-DC converter which achieves solar power conversion from high voltage, highly varying photovoltaic power sources. Voltage conversion circuits are described which have pairs of photovoltaic power interrupt switch elements and pairs of photovoltaic power shunt switch elements to first increase voltage and then decrease voltage as part of the desired photovoltaic DC-DC power conversion. Thus, the photovoltaic DC-DC converters can achieve efficiencies in conversion that are high compared to traditional through substantially power isomorphic photovoltaic DC-DC power conversion capabilities. Nevertheless, this approach has disadvantages as it requires an implementation for each panel in the array each of which converts the full energy produced by the panel which makes it expensive and less efficient.

US 20100126550 discloses an injection scheme. The disclosed injection circuit adjusts the operating point of the string to keep it running at maximum power production if one or more panels in a string are impaired. If the voltage across one or more of the panels in the string drops, the circuit injects a small amount of energy to compensate, and enables the string to continue operating at its maximum power point. The source of power for the injection circuit is the DC-Bus to which the string is connected or an external power source. However, this solution does not solve inefficiencies caused by un stabilized MPPT voltage, its dynamic range is relatively small since it depends on the inverter's MPP voltage level at a given time, it requires synchronization between the optimizers which makes it complex and relative expensive in large scale installations and its string size is limited by the Voc maximum level constrain.

It would therefore be desired to propose a system void of these deficiencies.

SUMMARY

It is an object of the present invention to provide an apparatus for extending the number of panels in strings of solar power generation systems that comprise solar panels in strings' array, up to twice the amount allowed by the local electrical code or the inverter limitation.

It is another object of the present invention to provide an apparatus and method for lifting up and stabilizing the operating voltage of the DC-Bus of the Photovoltaic arrays up to the maximum level possible by the inverter's maximum input voltage ($V_{DC}$, max), in order to increase inverter efficiency and reducing energy conduction loss.

It is still another object of the present invention to provide an apparatus for enlarging strings' regulation region ($V_{DC\text{-}Bus}-Vmpp_{(String)}$) in order to be able compensate for relatively large strings discrepancies due to diverse operating conditions, different power capabilities of panels or panels deficiencies.

It is still another object of the present invention to provide an apparatus for eliminating mutual interferences among strings comprising an array.

It is still another object of the present invention to provide a method maximizing the power produced by solar power generation systems that comprise solar panels in string and string's array.

It is still another object of the present invention to provide a method for enhancing the efficiency of inverters such as: central inverters, single MPPT inverters with multiple strings, multiple MPPT with multiple strings inverters and inverters with constant input voltage (no MPPT mechanism), both with a single or multiple strings.

Other objects and advantages of the invention will become apparent as the description proceeds.

The present invention relates to an apparatus for maximizing the power of a multi module solar string power generation system, comprising; (a) an array of strings of solar panels wherein said strings are connected in parallel to form said array of strings of solar panels; (b) providing at least one said string comprising; (i) at least one primary substring of solar panels; (ii) at least one extension substring with at least one solar panel; (c) a DC_Bus, connected to said string with said primary substring and said extension substring; (d) a solar inverter, connected, at its input, to said DC-Bus, for converting the solar DC power, from said string with at least one primary substring and said at least one extension substring, to AC power; and (e) an Injection Circuit (IC), connected to said primary substring and said DC-Bus, wherein said IC is also connected to said extension substring which comprises at least one solar panel, and wherein said IC maximizes the power production of said connected primary substring, utilizes the energy produced by the said extension substring to lift up and regulate the voltage level of the said string to the DC-Bus constant desired level and conducts the excess power from said extension substring to said solar inverter via said DC-Bus, comprising: (i) a first MPPT mechanism, for finding the MPP of said primary substring; (ii) a second MPPT mechanism, for finding the MPP of said extension substring, connected to said IC; (iii) a first DC/DC converter, for lifting up and regulating the said connected primary substring, to said stabilized constant desired level by converting and utilizing some of the power, from said extension substring; and (iv) a second DC/DC converter, for lifting up the voltage level of said connected extension substring to said stabilized constant desired level and for conducting the excess power from said extension substring that is not consumed by the first DC/DC converter, to said solar inverter via said connected DC-Bus.

In one embodiment, the IC comprises a third DC/DC converter, for utilizing excess power, from the second DC/DC converter, to said DC Bus.

In one embodiment, each string may comprise panels of different technology or different power capabilities than other strings in the array as long as it complies with the local electrical code and the inverter's maximum input voltage level constrain, and its minimum Vmpp level is within the first DC/DC converter regulation region.

In one embodiment, the extension substring may comprises panels of different technology or different power capabilities than its associated primary substring, wherein the extension substring panels may have a higher or lower power capability than the panels of the primary substring as long as its Voc level complies with the local electrical code.

The present invention also relates to a method for maximizing the power of a multi module solar string power generation system, comprising; (a) an array of strings of solar panels wherein said strings are connected in parallel to form said array of strings of said solar panels; (b) providing at least one said string comprising; (i) at least one primary substring of solar panels; (ii) at least one extension substring with at least one solar panel; (c) providing a DC-Bus, connected to said primary substring and said extension substring; (d) providing a solar inverter, connected, at its input, to said DC-Bus, for converting the solar DC power, from said string with at least one primary substring, to AC power; and (e) providing an IC, connected to said DC-Bus and to said string with at least one primary substring, wherein said IC is also connected to said extension substring; (f) lifting up and regulating the voltage of said string with said primary substring and said extension substring to a stabilized constant desired level by converting some of the power, from said extension substring; and (g) utilizing the excess power from said extension substring to said solar inverter via said DC-Bus.

BRIEF DESCRIPTION OF THE DRAWINGS

The accompanying drawings, and specific references to their details, are herein used, by way of example only, to illustratively describe some of the embodiments of the invention.

In the Drawings.

DETAILED DESCRIPTION

Photovoltaic solar power generation systems generate their maximum power when all the strings, comprising the array, operate at the same Maximum Power Point (MPP). However, operating conditions such as shading, clouds, dust, dirt, panel's azimuth and tilt, manufacturing tolerance mismatch, cells' aging as well as variety of deficiencies may cause some of the panels in the strings to produce less energy. It is well-known in the art that the current of each string is dictated by the weakest panel or panels in the string, and thus the entire string become weak. It is also well-known that when a string is weak or strong it may interfere with the power balances of the other strings in the array and therefore, has an austere impact on the efficiency of the whole array and the efficiency of the entire inverter. In addition, strong strings may heat up from the excess power, which will decrease their power production and may speed up the deterioration of the connected panels.

Figure 1:
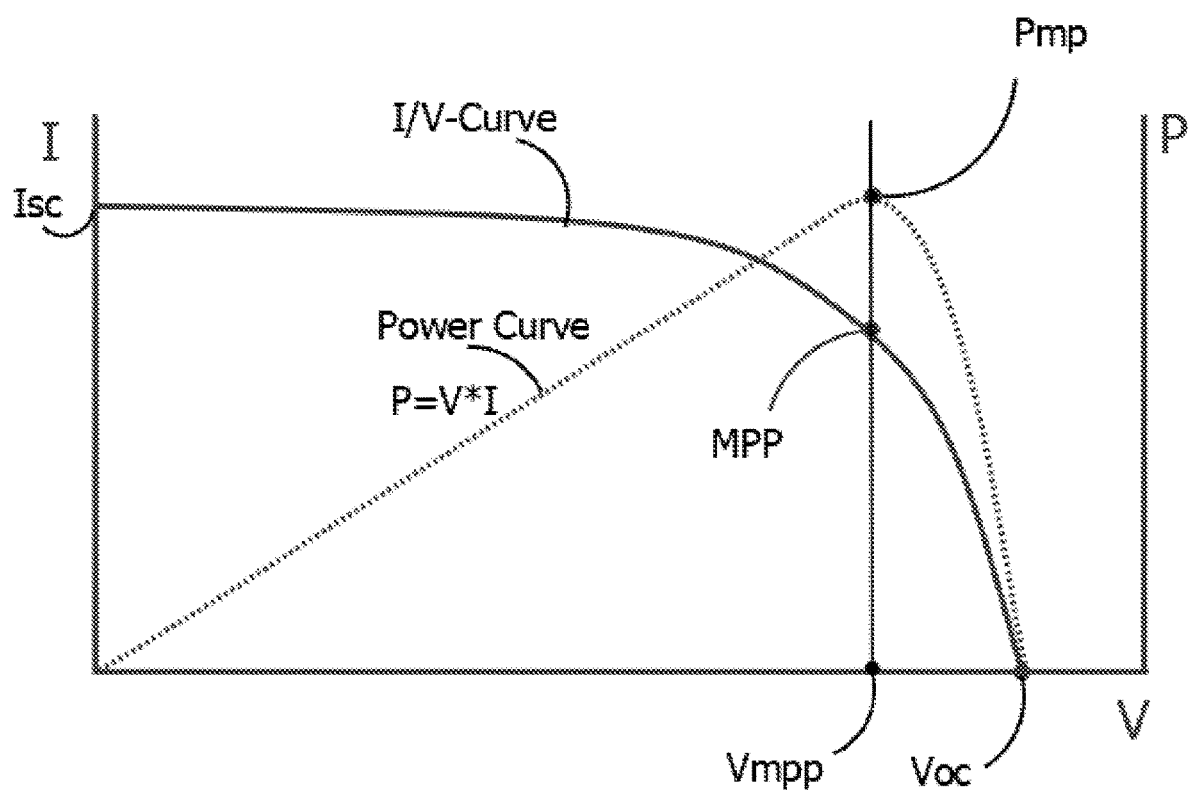
FIG. 1 is a diagram of graph which exhibits the electrical Power production performances of a solar cell based on their I-V curve, according to an embodiment.

FIG. 1 is a diagram which exhibits the electrical power production performances of a solar cell, based on their I-V curve, i.e. current and voltage characteristics, according to an embodiment. When solar cell is not connected to a load, the voltage developed across its terminals is defined as their open circuit voltage (Voc). When shortening the terminals of the cell it generates short circuit current, Isc. The Power Curve is obtained by multiplying the voltage by the current at each point in the graph. As shown by the power curve, the solar cell produces its maximum power (MP) at its Maximum Power Point when V=Vmpp. At Isc and Voc points, no power is produced by the solar cell.

Figure 2:
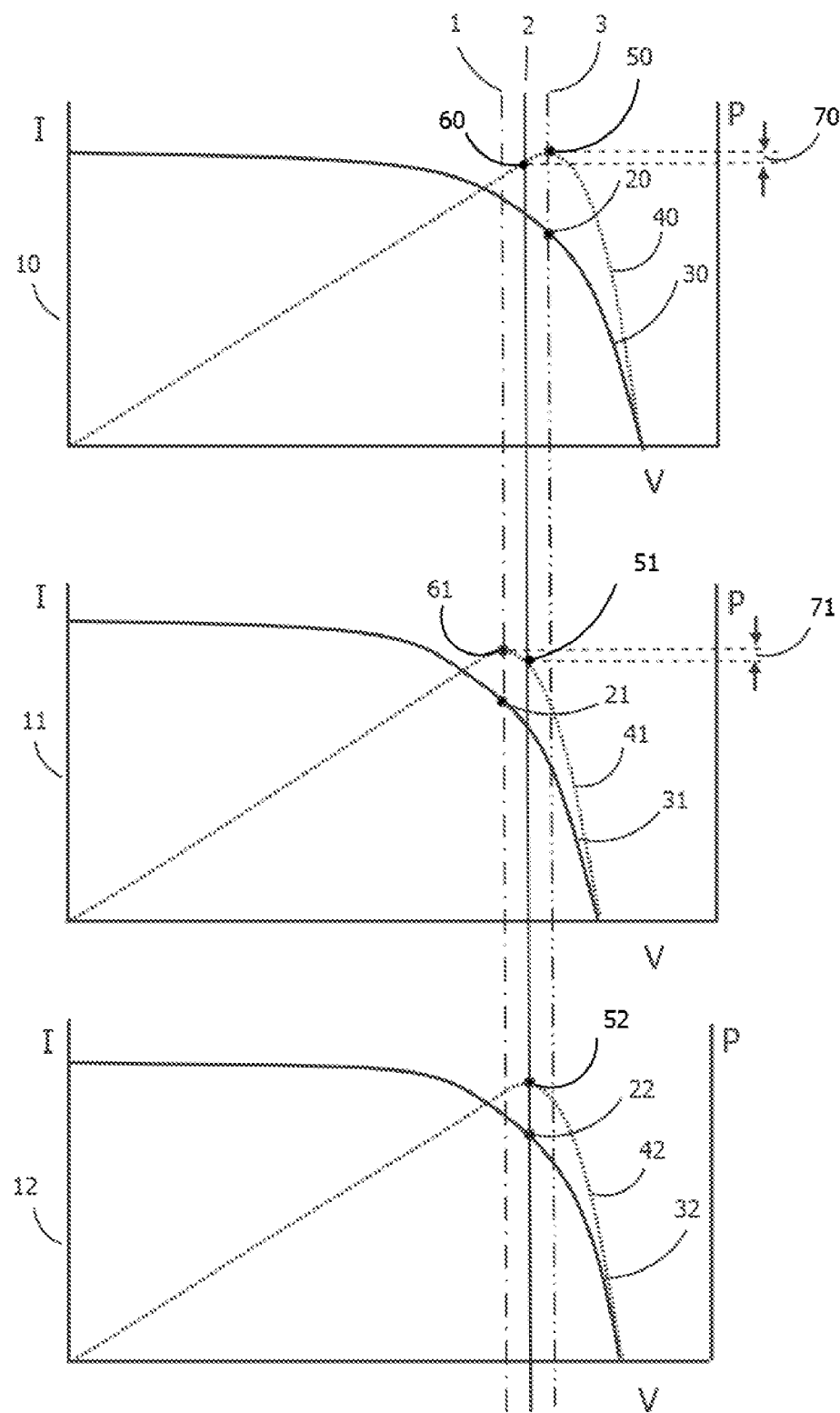
FIG. 2 is a diagram of 3 graphs which exhibit the electrical Power production performances of strings of solar panels' based on their I-V curve, i.e. current and voltage characteristics, according to an embodiment.

FIG. 2 is a diagram of 3 graphs which exhibit the electrical Power production performances of strings of solar panels' based on their I-V curve, i.e. current and voltage characteristics, according to an embodiment. When a number of solar panels are connected in series, i.e. a string, their combined energy output typically acts as curve 30 in graph 10. When working in a voltage mode circuit, the consumed current from the string, is fairly stable when the consumed voltage is raised until a certain point, after which the current drops rapidly when the voltage is raised, as shown by curve 30. Since the power of the string equals to the current times voltage (P=I*V), which its power is depicted by curve 40, the Maximum Power Point (MPP) of the string, on curve 30 (I-V curve), is located at MPP 20.

However, if the inverter is connected to a number of strings, the change of voltage may change the power level of the other strings which eventually will drag the MPPT of the inverter to some kind of an average voltage point between the strings, which is not the maximum power point for major part of the strings, effectively unbalancing the power production of the whole array and wasting power.

When a string is weak relative to other strings (due to part of the panels in a string are weaker from the reasons described above), the string do not generate as much power as the other normally operating strings, the I-V curve of the whole string changes as depicted by curve 31 of FIG. 2. The net effect then, is that the current of the weak string, typically drops at a different value and the weak string has a different curve than the fully operational string. The MPP of the weak string, depicted by curve 31, is located at point 21, which has different I-V values than the fully operational string which its power is depicted by curve 20. As shown, the MPP 21 of curve 31 is at a lower voltage value than the MPP 20 of curve 30.

When at least one of the strings of the array is weaker, the average MPP of the strings is affected. In this case, the inverter, which contains the Maximum Power Point Tracking (MPPT) circuitry, adjusts the voltage (and the current) of the whole array to the average MPP of the strings. However, the average MPP 22, as depicted in graph 12 of FIG. 2, is distant from the individual MPP's of each of the strings. The average MPP 22 is distant from the weak string MPP 21 (Delta Power 71=51−61) and distant from the strong string MPP 20 (Delta Power 70=60−50). Thus, the inverter causes all the strings to operate at a Power Point which is not the maximum power point for any of the strings, effectively unbalancing the power production of the whole array and wasting power.

Figure 3:
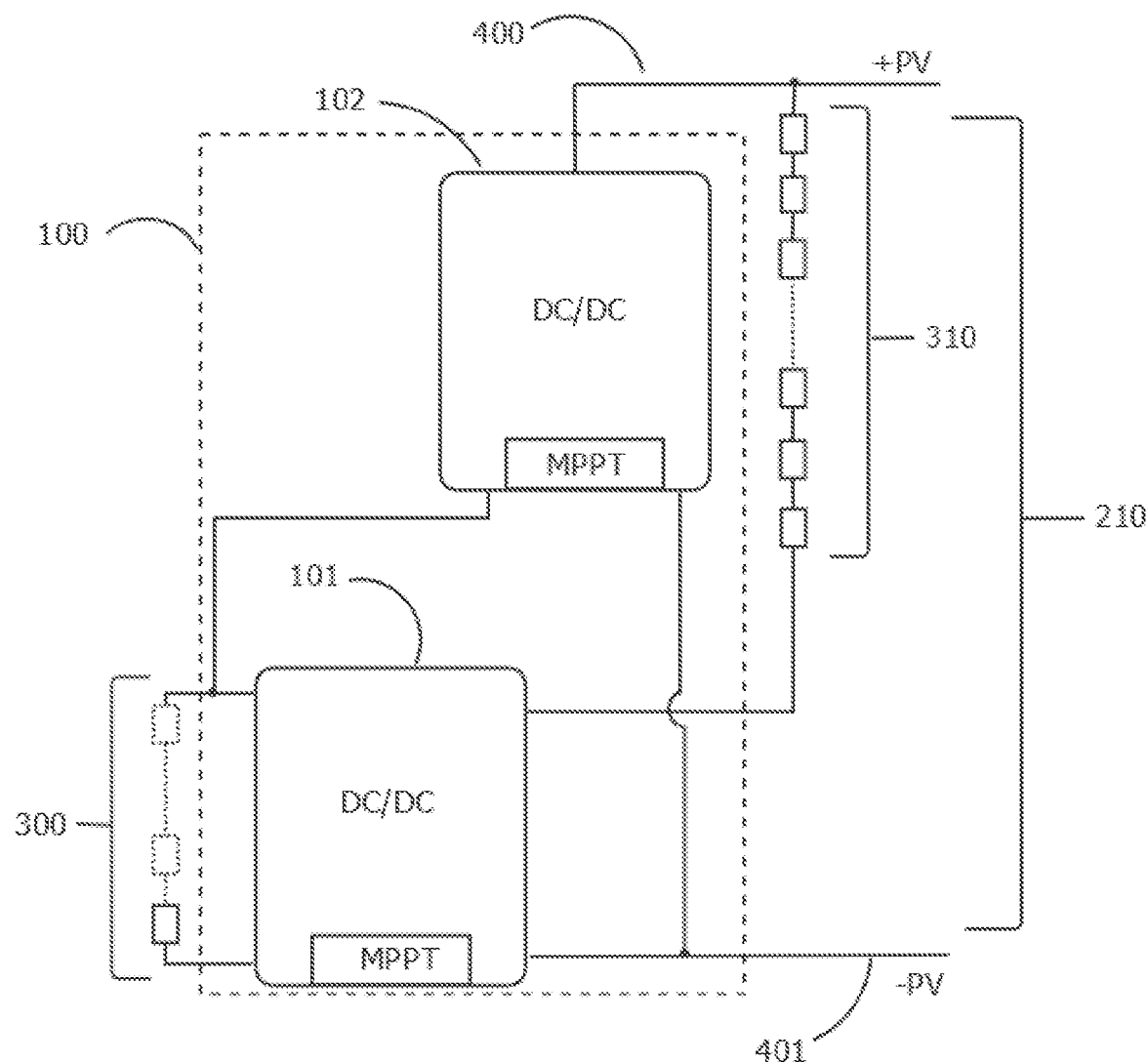
FIG. 3 is a schematic diagram depicting some of the inner parts of the IC, according to an embodiment.

FIG. 3 is a schematic diagram depicting some of the inner parts of the IC, according to an embodiment. For the sake of brevity, an inverter has not been shown in FIG. 3, nevertheless, the proposed system also includes a solar inverter, connected at its input to the DC-Bus 400-401, for converting the solar DC power from the strings, to AC power. In this embodiment, the IC 100 may be connected to the DC Bus 400-401 and to the string 210 which formed by primary substring 310 and extension substring 300, which comprises with at least one solar panel. The DC/DC 101 may comprise a first MPPT mechanism, for finding the MPP of primary substring 310. The DC/DC 102 may also comprise a second MPPT mechanism, for finding the MPP of the extension substring 300 and its optimized current and voltage.

As mentioned above, the current of the whole primary substring 310 is typically determined by its comprising panels' maximum power point current (Impp). In order to regulate the voltage of the DC-Bus ($V_{DC\text{-}Bus}$) to the desired voltage, the IC 100 is required to supply the amount of voltage which is the difference between the maximum power point voltage (Vmpp) of primary substring 310 and the desired voltage of the DC-Bus developed across DC-Bus 400 and 401. Hence, when regulated, the voltage of the string 310 should match the voltage of the other corresponding strings in the array. The IC 100 may also have a first DC/DC converter 101, for converting part of the power from extension substring 300 to the energy required to lift up the string 210 voltage to match the desired DC-Bus voltage ($V_{DC\text{-}Bus}$). The IC 100 may also comprise a second DC/DC converter 102, to lift up the extension substring 300 voltage level to match the constant desired voltage level of string 210 and the DC-Bus ($V_{DC\text{-}Bus}$) where the lifting of the DC-Bus voltage to a desired voltage level is limited only by the Local Electrical Code (LEC) or inverter's maximum input voltage.

In one embodiment the IC 100, of FIG. 3, can enhance/reduce its output voltage while measuring the power from the primary substring 310 until the primary substring 310 reaches its MPPT point. Thus, the first DC/DC converter 101 may be used for regulating the power of the connected primary substring 310 by converting some of the power from the extension substring 300 into current and voltage for optimizing primary substring 310. The IC 100 may also have a second DC/DC converter 102, which is connected at its input to extension substring such as extension substring 300, and at its output to the DC-Bus 400-401. The DC/DC converter 102 may be used for converting and utilizing the excess power from the extension substring 300, i.e. the power not used by DC/DC converter 101 for optimize the power of primary substring 310, to the connected DC-Bus 400-401. Therefore, the IC 100 can optimize the power production of the connected primary substring 310 and the connected extension substring 300 and may lift up the voltage of string 210 which comprises by primary substring 310 and extension substring 300 to match the constant voltage desired level of the DC-Bus ($V_{DC\text{-}Bus}$).

According to an embodiment, the converters of IC 100 may comprise a DC/DC boost and buck converters or may have any other relevant topology. Thus, for example, the IC 100 can increase its output voltage, on the expense of extension substring 300 current, for lifting up the DC voltage on DC-Bus lines 400-401 and therefore lifting up the input voltage level of the inverter making it more efficient.

The systems and methods above disclosed monitor and regulate all strings outputs such that weak and strong strings alike will have a stable and constant output voltage (desired Voltage) not affected by solar panels and string performance changes due to load and environmental conditions changes (e.g., irradiation, shading, clouds, dust and dirt, to name a few). For example as shown in FIG. 3, IC 100 measures constantly the string output and compares it to the DC-Bus 400, 401 desired voltage. When the output of the string, in a given time, is less or more that the desired voltage for the DC-Bus lines, the IC 100 using DC/DC 101 will change its output voltage accordingly as required to keep DC-Bus voltage 400, 401 constant at the desired voltage level while maintaining string's 210 substrings, primary substring 310 and extension substring 300, at their maximum power point. By keeping the strings output at a constant and stabilized voltage while encapsulating the solar panel performance changes variance (Vmp) within the string boundaries, the string mutual interference being eliminated so that the whole array is constantly balanced at its maximum power point.

Figure 4:
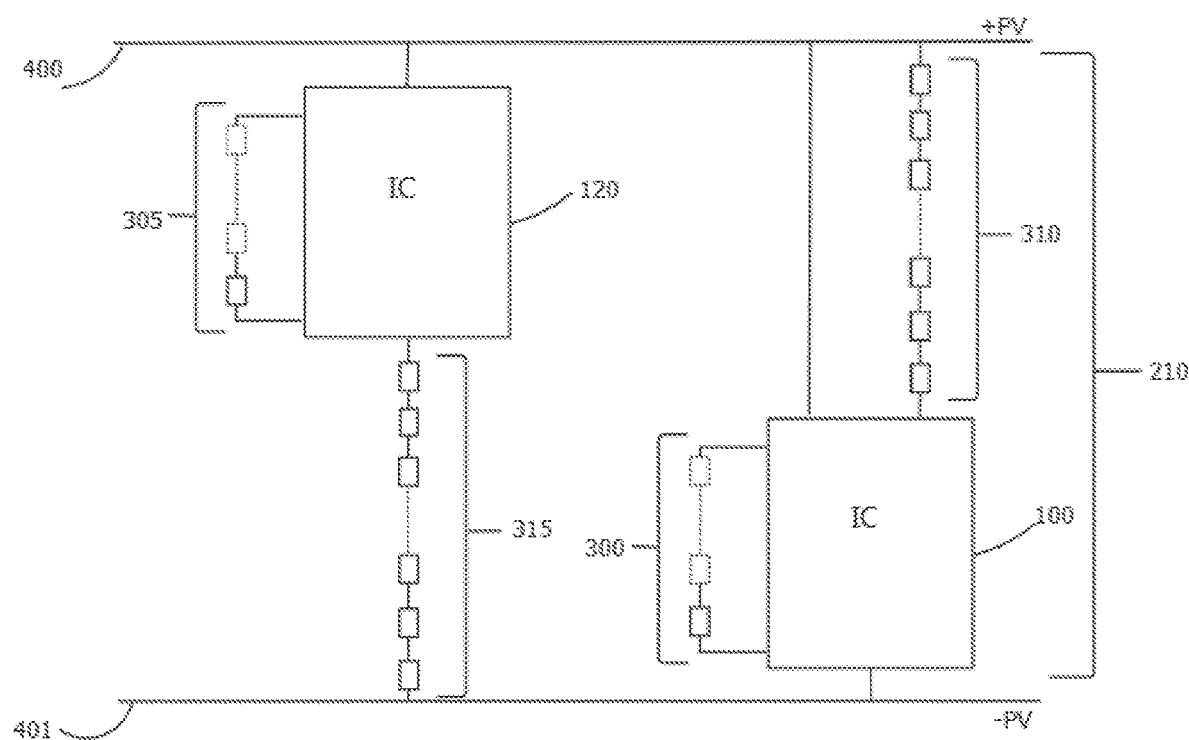
FIG. 4 is a schematic diagram depicting strings of solar panels connected in an array, with an Injection Circuit (IC), according to an example.

FIG. 4 is a schematic diagram depicting strings of solar panels connected in an array, with injection circuits, according to an example. In some embodiments the IC may be connected to extension substring 305 and primary substring 315 and connected to the positive DC-Bus line 400, such as depicted for IC 120. Other embodiments are possible as well. In one embodiment the extension substring connected directly to the IC where the IC uses some of the power from the extension substring to regulate the power of the primary substring.

Figure 5:
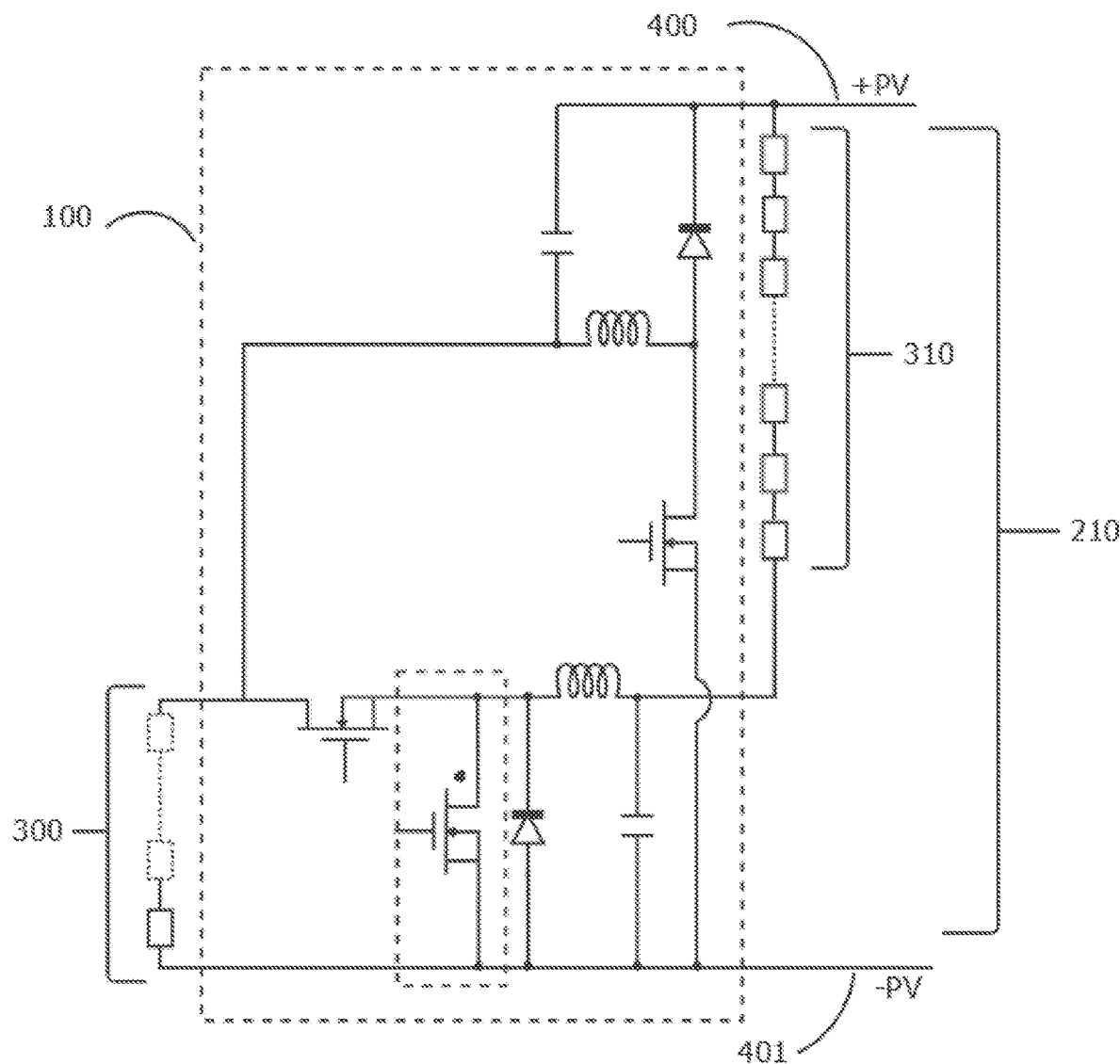
FIG. 5 is a schematic diagram of some of the inner parts of an exemplified IC 100 that describe possible solution for FIG. 3, according to an embodiment.

FIG. 5 is a schematic diagram of some of the inner parts of an exemplified IC 100 that describe possible solution for FIG. 3, according to an embodiment. As known in the art, there can be many electrical implementations for the IC 100, nevertheless, for the sake of enablement, an IC, e.g. using modules boost and buck, is depicted as an embodiment of an IC 100.

Figure 6:
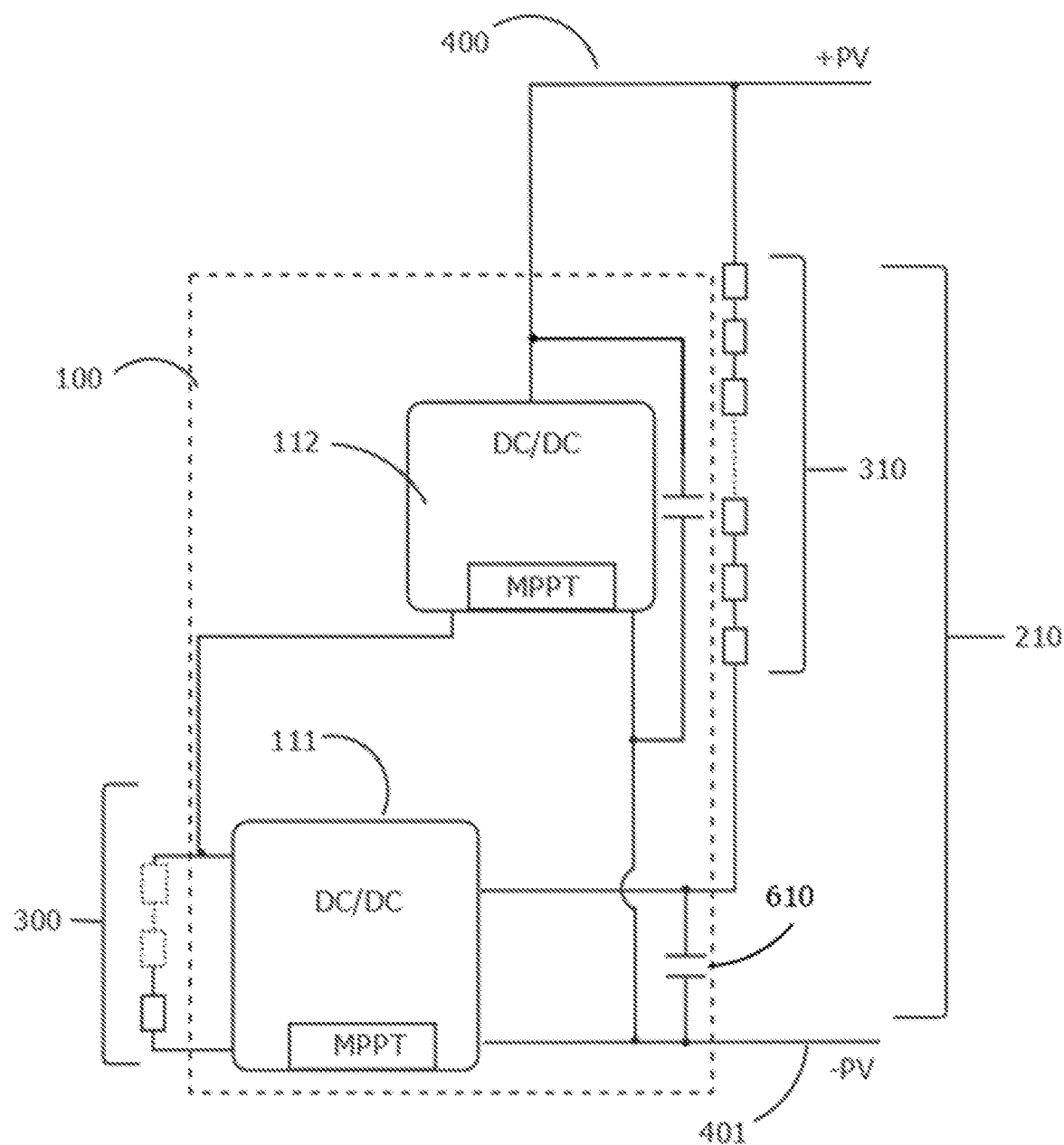
FIG. 6 is a schematic diagram depicting some of the inner parts of the IC, according to another embodiment.

FIG. 6 is a schematic diagram depicting some of the inner parts of the IC, according to another embodiment. In this embodiment, the IC 100 may be connected to the DC-Bus 400-401 and to the string 210, which comprises primary substrings 310 and extension substring 300. The IC 100 may also be connected, at its input, to extension substring 300, which comprises one panel, or more than one panel, as described above in relations to FIG. 3. The IC 100 may comprise a first MPPT mechanism, for finding the MPP of primary substring 310. The IC 100 may also comprise a second MPPT mechanism, for finding the MPP of extension substring 300 and its optimized current and voltage. In this embodiment the IC 100, of FIG. 6, can adjust the voltage on the capacitor 610, by draining power from the extension substring 300 to the capacitor 610. The IC 100 can enhance/reduce the voltage on capacitor 610 while measuring the power from the primary substring 310 until the string 310 reaches its MPPT point. Thus, the first DC/DC converter 111 may be used for regulating the power of the string 210 by converting some of the power from the extension substring 300 into power on the capacitor 610. The IC 100 may also have a second DC/DC converter 112, which is connected at its input to the extension substring such as extension substring 300, and at its output to the DC-Bus 400-401. The DC/DC converter 112 may be used for finding the MPP of extension substring 300 as well as for lifting up the voltage of extension substring 300 to the desired constant voltage level of DC-Bus 400-401 and utilizing the excess power from the extension substring 300, i.e. the power left after regulating the power of the primary substring 310, to the inverter via DC-Bus 400-401.

Figure 7:
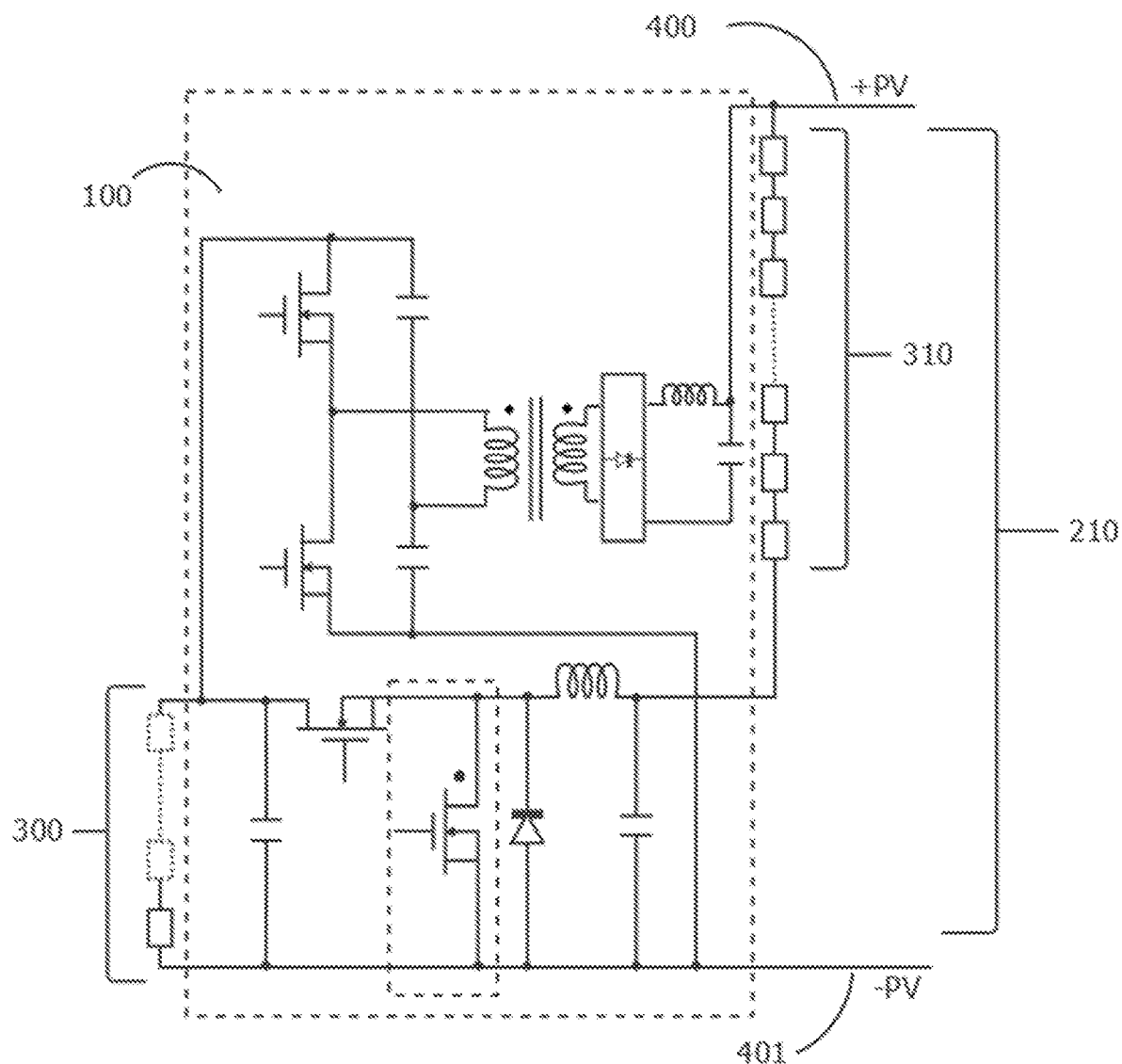
FIG. 7 is a schematic diagram of some of the inner parts of an exemplified IC 100 that describe possible solution for FIG. 6, according to an embodiment.

FIG. 7 is a schematic diagram of some of the inner parts of an exemplified IC 100 that describe possible solution for FIG. 6, according to an embodiment. As known in the art, there can be many electrical implementations for the IC 100, nevertheless, for the sake of enablement, an IC, is depicted as an embodiment of an IC 100.

Figure 8:
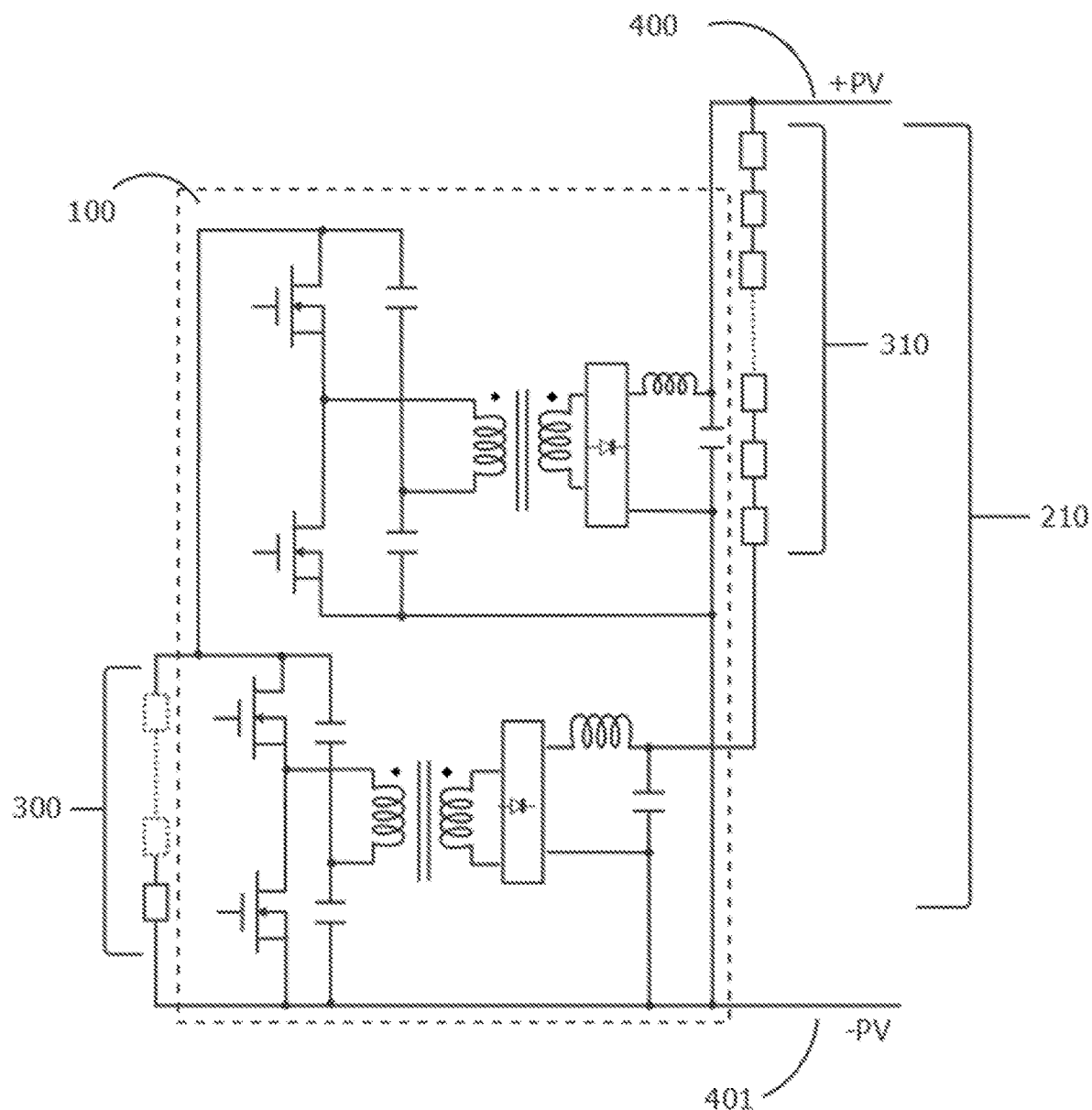
FIG. 8 is a schematic diagram of some of the inner parts of an exemplified IC 100 that describe possible solution for FIG. 6, according to an embodiment.

FIG. 8 is a schematic diagram of some of the inner parts of an exemplified IC 100 that describe possible solution for FIG. 6, according to an embodiment. As known in the art, there can be many electrical implementations for the IC 100, nevertheless, for the sake of enablement, an IC, is depicted as an embodiment of an IC 100.

Figure 9:
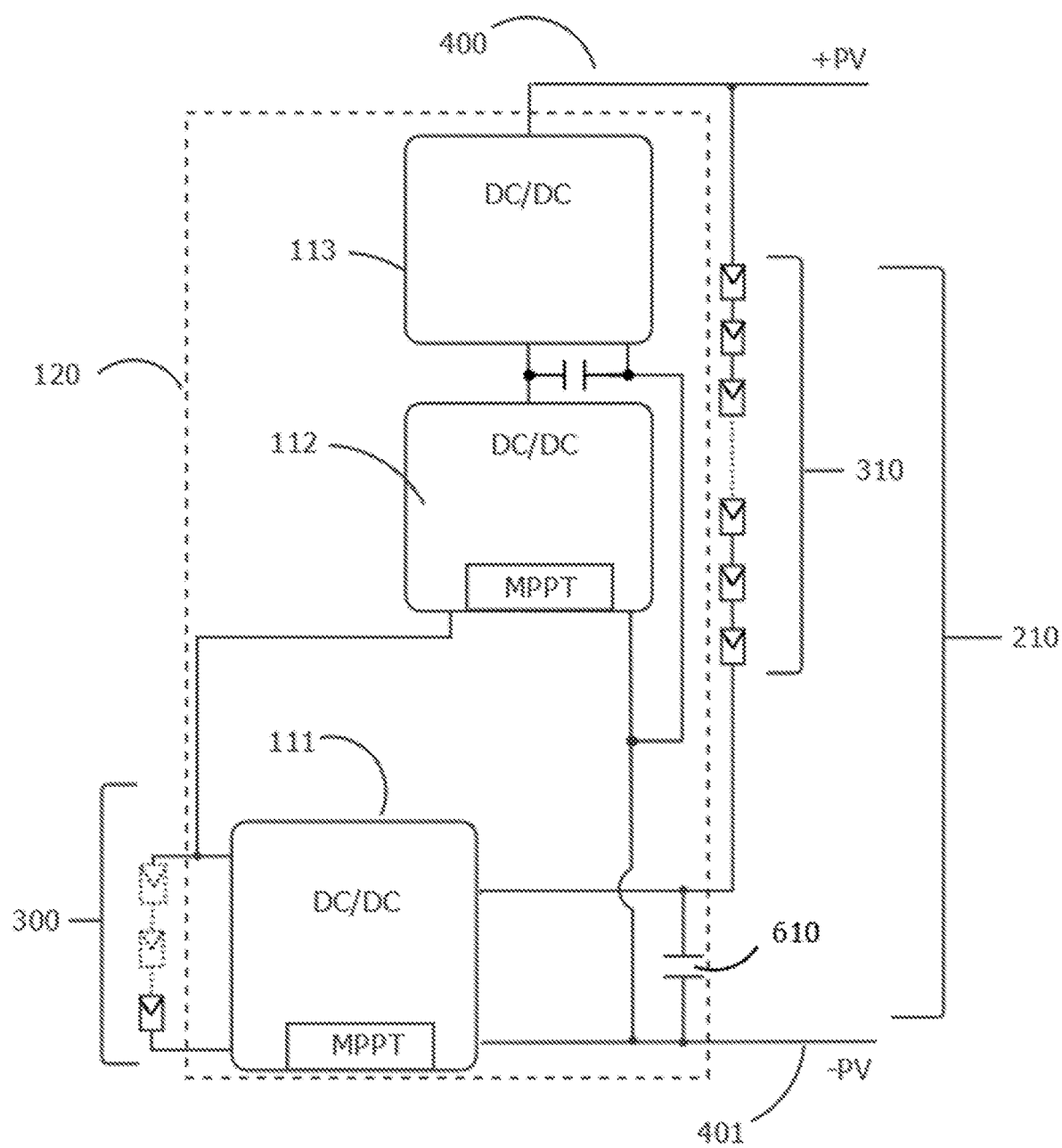
FIG. 9 is a schematic diagram depicting some of the inner parts of the IC, according to yet another embodiment.

FIG. 9 is a schematic diagram depicting some of the inner parts of the IC, according to yet another embodiment. In this embodiment, the IC 120 is similar to the IC 100 described in relations to FIG. 6, however, in this embodiment the IC 120 may have another DC/DC converter 113. Since the DC/DC convertors 112 may have to cope with a very high voltage variant at their input and a high voltage variant at their output, another DC/DC converter 113 may be added. Thus, the DC/DC converters 112 may be designed to cope with a high variant at their input. However, their output may be designed to be set and known. Therefore, inverter 113 only needs to cope with the voltage gap where its input and output are set and known. This embodiment may simplify the implementation of the design and increase the total efficiency of the IC 120, in comparison to IC 100.

Figure 10:
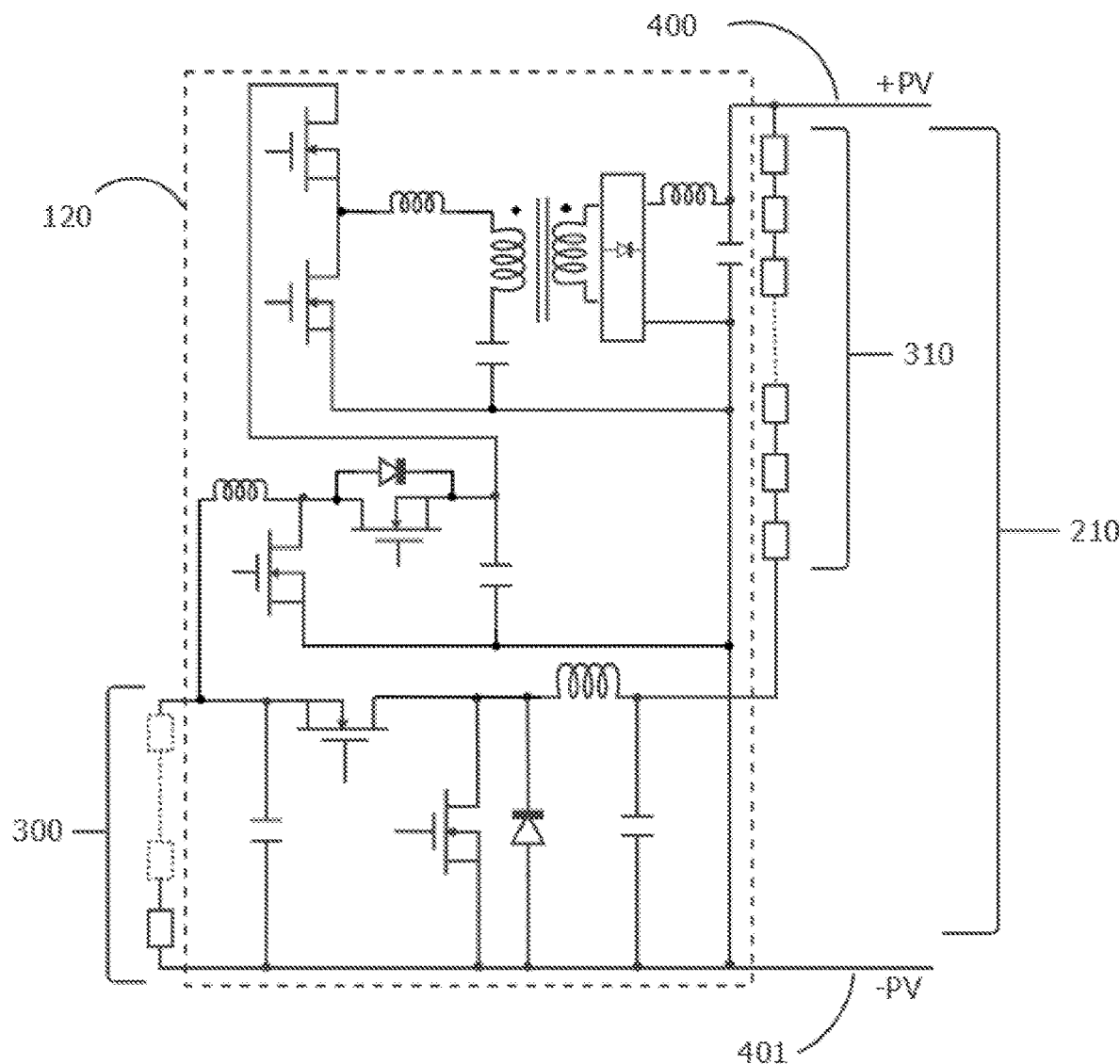
FIG. 10 is a schematic diagram of some of the inner parts of an exemplified IC 120 that describe possible solution for FIG. 9, according to an embodiment.

FIG. 10 is a schematic diagram of some of the inner parts of an exemplified IC 120 that describe possible solution for FIG. 9, according to an embodiment. As known in the art, there can be many electrical implementations for the IC 120, nevertheless, for the sake of enablement, an IC, is depicted as an embodiment of an IC 120.

In the solutions depicted above the inefficiency of the conversion of the IC, in worst case scenario when the primary substring and the extension substring are the same size, can reach a maximum of half the conversion losses had the whole string power been converted as it is accomplished by conventional panel or string optimizers.

While the above description discloses many embodiments and specifications of the invention, these were described by way of illustration and should not be construed as limitations on the scope of the invention. The described invention may be carried into practice with many modifications which are within the scope of the appended claims.

The invention claimed is:

1. An apparatus for extending string size and maximizing the power of a multi module solar string power generation system, comprising:
    at least one string comprising a primary substring of solar panels and an extension substring of solar panels with at least one solar panel;
    a DC-Bus connected to said string;
    a solar inverter, connected, at its input, to said DC-Bus, for converting the solar DC power, from said at least one string, to AC power; and
    an Injection Circuit (IC), connected to said primary substring and said DC-Bus, wherein said IC is also connected to said extension substring, which comprises at least one solar panel, and wherein said IC maximizes the power production of said connected primary substring, utilizes the energy produced by the said extension substring to lift up and regulate the voltage level of the said DC-Bus and conducts the excess power from said extension substring to said solar inverter via said DC-Bus, where said IC comprises:
        a first MPPT mechanism, for finding the MPP of said primary substring, connected to said IC;
        a second MPPT mechanism, for finding the MPP of said extension substring, connected to said IC;
        a first DC/DC converter, for converting and regulating the power of said connected primary substring by converting some of the power, from said extension substring to lift up the voltage of the said DC-Bus to a desired voltage level; and
        a second DC/DC converter, for converting and regulating the power from said extension substring and for converting and utilizing the excess power from said extension substring to said DC-Bus.

2. An apparatus according to claim 1, where the string is part of an array of strings of solar panels wherein said strings are connected in parallel through the DC-Bus to form said array of strings of solar panels.

3. An apparatus according to claim 2, where each said string of said array comprises panels of different technology and power capabilities than then other said strings in said array.

4. An apparatus according to claim 1, where said primary substring comprises panels of different technology or different power capabilities than its associated said extension substring.

5. An apparatus according to claim 1, where the IC comprises a third DC/DC converter, for utilizing excess power, from the panels which have a higher power capability, to said DC-Bus.

6. An apparatus according to claim 1 where the inverter comprises an MPPT mechanism at its DC-Bus input.

7. An apparatus according to claim 1 where the inverter has a constant input voltage.

8. An apparatus according to claim 1 where the lifting of the DC-Bus voltage to a desired voltage level is limited only by the Local Electrical Code (LEC) or the inverter's maximum input voltage.

9. A method for maximizing the power of a multi module solar string power generation system, comprising:
    at least one string comprising a primary substring of solar panels and an extension substring of solar panels with at least one solar panel;
    providing a DC-Bus, connected to said string;
    providing a solar inverter, connected, at its input, to said DC-Bus, for converting the solar DC power, from said at least one string, to AC power; and
    providing an Injection Circuit (IC), connected to said DC-Bus, wherein said IC is also connected to said primary substring and said extension substring;
    lifting up the voltage of said primary substring to a stabilized constant desired voltage level by converting some of the power, from said extension substring; and
    lifting up the power of said extension substring to a stabilized constant desired voltage level and utilizing the excess power from said extension substring to said DC-Bus.

10. A method according to claim 9, where the string is part of an array of strings of solar panels wherein said strings are connected in parallel through the DC-Bus to form said array of strings of solar panels.

* * * * *